June 29, 1937.  L. R. LUDWIG  2,085,109

ELECTRICAL CONVERSION SYSTEM

Original Filed Oct. 11, 1934

WITNESSES:

INVENTOR
Leon R. Ludwig.
BY
ATTORNEY

Patented June 29, 1937

2,085,109

UNITED STATES PATENT OFFICE 2,085,109

ELECTRICAL CONVERSION SYSTEM

Leon R. Ludwig, Forest Hills, Wilkinsburg, Pa., assignor to Westinghouse Electric & Manufacturing Company, East Pittsburgh, Pa., a corporation of Pennsylvania Original application October 11, 1934, Serial No. 747,913. Divided and this application June 15, 1935, Serial No. 26,812

2 Claims. (Cl. 172—237)

My invention relates to an electrical conversion system, and particularly to a control system for a converter utilized for converting direct current into alternating current.

This application is a division of my copending application Serial No. 747,913, filed October 11, 1934.

When an arc-type converter is utilized to produce alternating current from direct current each valve of the converter passes through three phases during each complete cycle of operation. The first of these phases may be termed the conducting period. The wave form of the output current of a converter is such that the current in any valve must rise from zero to its maximum value in a very short period of time.

When a converter is producing direct current an occasional commutation period of extra long duration or the delayed starting of one of the valves would pass unnoticed. But when the converter is operating to produce alternating current accurate commutation becomes a matter of great importance because then successful commutation depends upon accurate starting at fixed time intervals and complete transfer of the arc within a definite time interval after the starting of the valve. If the commutation is not completed within the allowed time period the converter fails to complete the commutation and the valve action is lost, resulting in a forward-fire.

The second phase may be termed the rectification period. When the current through a valve is reduced to zero the anode voltage rapidly becomes negative with respect to the cathode. During the short interval of time during which the anode remains negative there is a possibility that the valve will back-fire. In a converter producing alternating current a back-fire is of little importance as the reverse current resulting from a back-fire is rapidly reduced to zero and the only ill effect is that it leaves the arc space highly ionized and therefore greatly increases the probability of a forward-fire during the third phase of operation.

The third and in polyphase converters the longest period of the cycle may be termed the control period. During this period the anode is positive with respect to the cathode and control means must be provided to prevent the formation of an arc before the next conducting period is reached. The frequent loss of control during this period resulting in a premature arc formation or forward-fire is the most serious defect of heretofore known converters.

Forward-firing of the valves of the heretofore known converters results in a short circuit of both the supply and load circuits with consequent opening of breakers and interruption of service.

It is accordingly an object of my invention to provide a valve-type converter capable of riding through a forward-fire without interruption of service.

In the operation of converters for producing alternating current, it is necessary to commutate the valves of the converter during the time when the phase voltage of the valve being commutated is negative with respect to the phase voltage of the next succeeding valve. It has heretofore been found desirable to commutate the valves at a considerable time interval before the anode of the commutated valve becomes positive with respect to the anode of the succeeding valve. This results in the converter operating at a leading power factor. If a forward-fire should occur in one of the inactive valves of a converter, it is necessary to introduce sufficient leading wattless power into the system to produce commutation between the forward-firing valve and the next succeeding valve in order to prevent an interruption of service.

In converters, as heretofore constructed, it has been necessary to secure at all reliable operation, to constantly commutate the valves at such a leading power factor that most forward-fires will be eliminated. However, this method of operation is highly undesirable, as the poor power factor of the conversion necessitates additional K. V. A. capacity on the alternating current side of the converter.

It is an object of my invention to provide means responsive to fault current in the converter for increasing the leading wattless power for producing commutation of the valves of the converter.

The necessary wattless power for procuring commutation may be secured by advancing the firing time of the valve as claimed in my application Serial No. 747,913 of which this application is a division or by increasing the commutating angle by increasing the potential of the alternating current circuit.

In the event that the load circuit comprises such devices as synchronous motors the increased potential may be provided by increasing the exciting current and thus increasing the leading power factor of the load.

Other objects and advantages of my invention will be apparent from the following detailed description taken in conjunction with the accompanying drawing, in which.

In the operation of the valve type converter for producing alternating current from direct current, it is necessary to commutate the valves before the voltage in the transformer associated with the succeeding valve becomes greater than the transformer voltage of the commutated valve.

In the event that the inactive valve loses control or forward-fires, prior to its normal conducting period, the current drawn from the direct-current line will rapidly increase, so that the release of the next succeeding valve at the normal time interval will afford insufficient commutating E. M. F. to extinguish the current flowing in the forward-firing valve.

For certain types of loads, it is possible to secure the additional wattless current necessary for commutating the valves by momentarily increasing the alternating-current potential.

Figure 1:
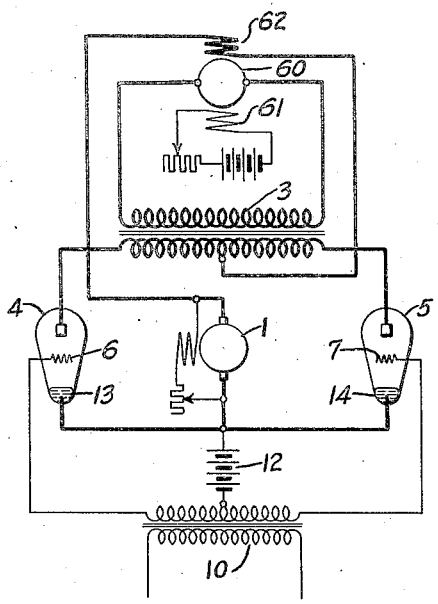
Figure 1 is a schematic illustration of a converter showing means for increasing the commutating potential available for commutating the valves of the converter.

In the embodiment of my invention according to Fig. 1, a direct-current source 1 supplies load current to an alternating-current machine load system through a coupling transformer 3 which is controlled by means of suitable electric valves 4 and 5 preferably of the vapor arc type. The valves 4 and 5 of the converter are provided with suitable control electrodes, usually in the form of control grids 6 and 7, which are supplied with control potential from a suitable control source, usually a control transformer 10, supplied with alternating current of the frequency desired in the alternating-current load system. A suitable direct-current bias 12 is provided between the cathodes 13—14 and the grids 6 and 7 of the valves 4 and 5 to determine the normal firing time for the valves 4 and 5 of the converter.

In the modification according to Fig. 1, I have shown a converter system particularly adapted for supplying potential to a motor 60 of the synchronous type. The field of the motor is divided into two windings, one of which 61 receives a substantially constant excitation, and the other 62 is connected in series with the direct-current source 1 to produce a compounding effect. In the event of forward-fire in one of the valves of the converter, the compound field 62 will over-excite the machine 60, causing it to draw a substantial amount of leading wattless power which then becomes available to commutate the next succeeding valve. This type of operation is diagrammatically illustrated in Fig. 7, in which the dotted curve shows the increased potential $V^2$ of the alternating current system resulting from the excitation of the compound field 62.

Figure 2:
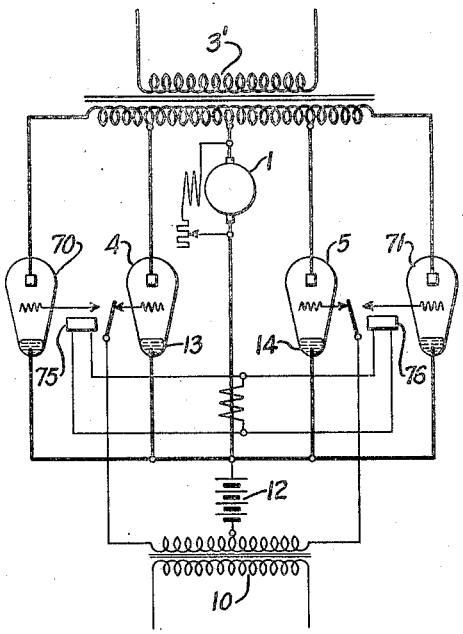
Fig. 2 is a schematic illustration of a further modification.
Figure 3:
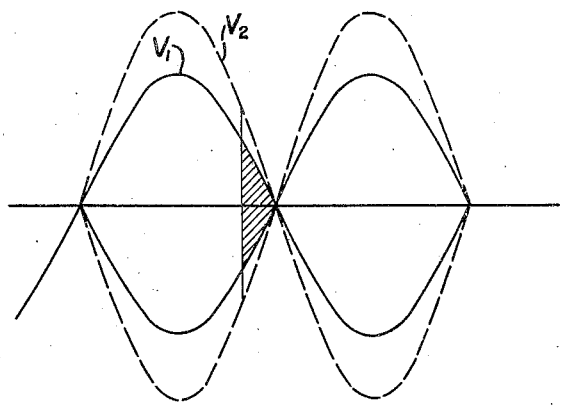
Fig. 3 is a graphical illustration of the potential relation in a 1φ converter according to my invention.

This increased potential then supplies the increased commutating E. M. F. required by the valves.

Where it is impractical to secure the additional wattless power by excitation of the field of the load motors, substantially identical results may be obtained by increasing the alternating-current potential. In the modification according to Fig. 2, I have shown a system for securing the additional alternating potential desired. The converter is provided with auxiliary tubes 70—71 connected to the coupling transformer 3' in a manner as to operate at a normally higher potential. During normal operation of the device, the primary tubes 4—5 are connected to the source of control potential 10, but in the event of a forward-fire, the increase in current in the direct-current system provides a potential for operating relays 75—76 which disconnect the control potential from the primary tubes 4 and 5 and connect it to the parallel-connected tubes 70—71, which in effect, increases the alternating-current potential applied to the valves and provides the additional potential necessary for commutating the forward-firing tubes.

For the purposes of simplicity and illustration, my invention is applied to single-phase systems. However, in normal operation, a converter will be polyphase and the valves and control system will be multiplied accordingly.

While I have shown specific embodiments of my invention for purposes of illustration, it will be apparent to those skilled in the art that changes and modifications may be made therein without departing from the true spirit of my invention, or the scope of the appended claims.

I claim as my invention:

1. In a valve-type converter for supplying load current to an alternating current load system, a plurality of electric valves in said converter, control electrodes for each of said valves, means for supplying control energy to said control electrodes for controlling the conductivity of said valves and means responsive to forward fire in one of said valves for increasing the integrated electromotive force available for transferring current between said valves.

2. An electric translating system comprising an alternating current load circuit, a direct current supply circuit, a plurality of electric valves for transferring energy between said supply circuit and said load circuit, control elements in said valves, means for periodically impressing control impulses on said control elements, a synchronous machine connected to said load circuit, a field winding in said machine, said field winding being connected in series with said supply circuit whereby an abnormal increase in the direct current overexcites said synchronous machine to increase the potential available for commutating said valves.

LEON R. LUDWIG.